(12) United States Patent
Takagi

(10) Patent No.: US 9,122,437 B2
(45) Date of Patent: Sep. 1, 2015

(54) INFORMATION PROCESSING APPARATUS, METHOD, AND MEDIUM FOR MANAGING STATUS INFORMATION ABOUT AN IMAGE FORMING APPARATUS

(71) Applicant: CANON KABUSHIKI KAISHA, Tokyo (JP)

(72) Inventor: Noriko Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/017,055

(22) Filed: Sep. 3, 2013

(65) Prior Publication Data
US 2014/0063527 A1 Mar. 6, 2014

(30) Foreign Application Priority Data
Sep. 5, 2012 (JP) ................. 2012-195084

(51) Int. Cl.
G06F 3/12 (2006.01)
H04N 1/00 (2006.01)
G06K 15/00 (2006.01)

(52) U.S. Cl.
CPC ............ *G06F 3/1296* (2013.01); *G06F 3/1221* (2013.01); *G06F 3/1229* (2013.01); *G06F 3/1273* (2013.01); *G06F 3/1285* (2013.01); *H04N 1/00344* (2013.01); *H04N 1/00896* (2013.01); *H04N 1/00925* (2013.01); *H04N 2201/0039* (2013.01); *H04N 2201/0094* (2013.01); *H04N 2201/3202* (2013.01); *H04N 2201/3278* (2013.01); *Y02B 60/1271* (2013.01)

(58) Field of Classification Search
CPC ... G06F 3/1218; G06F 3/1229; G06F 3/1273; G06F 3/1285; H04N 1/00204; H04N 1/00244; H04N 1/00885; H04N 1/00896
USPC ........ 358/1.1, 1.9, 1.13, 1.14, 1.15, 1.18, 402
See application file for complete search history.

(56) References Cited

U.S. PATENT DOCUMENTS

| 8,843,547 B2 * | 9/2014 | Tanzawa ................. 709/203 |
| 2010/0049871 A1 * | 2/2010 | Webster et al. ........... 709/245 |
| 2011/0235108 A1 | 9/2011 | Kato |
| 2012/0062946 A1 * | 3/2012 | Kitagata ................. 358/1.15 |

FOREIGN PATENT DOCUMENTS

JP 2011-204027 A 10/2011

\* cited by examiner

*Primary Examiner* — Gabriel Garcia
(74) *Attorney, Agent, or Firm* — Canon USA Inc. IP Division

(57) ABSTRACT

An image forming apparatus includes a job history control unit and a status control unit. If the job history control unit is transmitting a job history when the status control unit transmits status information to a management server, the status control unit transmits status information including prohibition against entering a power saving mode. If the job history control unit is not transmitting a job history, the status control unit transmits status information including permission to enter the power saving mode to the management server.

7 Claims, 13 Drawing Sheets

FIG.11A

1400 STATUS INFORMATION

```
<?xml version="1.0" encoding="UTF-8" ?>
<AgentInformation version="3.00">
   <AgentProperty>
      <AgentID>2</AgentID>
      <TotalDiskSpace>7167</TotalDiskSpace>
      <StatusCheckInterval>5</StatusCheckInterval>      }1401
      <DeviceName>MFP MODEL ABC</DeviceName>
      <SerialNumber>1234567890</SerialNumber>
      <IPAddress>111.222.333.444</IPAddress>
   </AgentProperty>
   <AgentStatus>
      <UsedAgentDiskSpace>0</UsedAgentDiskSpace>
      <FreeDiskSpace>7098</FreeDiskSpace>
      <RemainderJobCount>4</RemainderJobCount>           }1402
      <LastRegistrationResult>Success</LastRegistrationResult>
      <Status>EnablePowerSavingMode</Status>
   </AgentStatus>
   <TransferSchedule>
      <TransferMode>1</TransferMode>
      <TransferInterval>10</TransferInterval>            }1403   1404
      <TransferEndTime>8:00</TransferEndTime>                   PERMISSION TO
      <TransferStartTime>0:00</TransferStartTime>              ENTER POWER
   </TransferSchedule>                                          SAVING MODE
</AgentInformation>
```

FIG.11B

1400 STATUS INFORMATION

```
<?xml version="1.0" encoding="UTF-8" ?>
<AgentInformation version="3.00">
   <AgentProperty>
      <AgentID>2</AgentID>
      <TotalDiskSpace>7167</TotalDiskSpace>
      <StatusCheckInterval>5</StatusCheckInterval>      }1401
      <DeviceName>MFP MODEL ABC</DeviceName>
      <SerialNumber>1234567890</SerialNumber>
      <IPAddress>111.222.333.444</IPAddress>
   </AgentProperty>
   <AgentStatus>
      <UsedAgentDiskSpace>0</UsedAgentDiskSpace>
      <FreeDiskSpace>7098</FreeDiskSpace>
      <RemainderJobCount>4</RemainderJobCount>           }1402
      <LastRegistrationResult>Success</LastRegistrationResult>
      <Status>DisablePowerSavingMode</Status>
   </AgentStatus>
   <TransferSchedule>
      <TransferMode>1</TransferMode>
      <TransferInterval>10</TransferInterval>            }1403   1405
      <TransferEndTime>8:00</TransferEndTime>                   PROHIBITION AGAINST
      <TransferStartTime>0:00</TransferStartTime>              ENTERING POWER
   </TransferSchedule>                                          SAVING MODE
</AgentInformation>
```

FIG.12

1500 JOB HISTORY MANAGEMENT AGENT LIST SCREEN

JOB HISTORY MANAGEMENT AGENT LIST

| AGENT ID 1501 | STATUS 1502 | TRANSMISSION SETTING 1503 | NUMBER OF UNTRANSMITTED JOB HISTORIES 1504 | FREE SPACE 1505 | DETAIL BUTTON 1506 |
|---|---|---|---|---|---|
| AGENT ID | STATUS | TRANSMISSION SETTING | NUMBER OF PIECES OF UNTRANSMITTED JOB HISTORY INFORMATION | HDD FREE SPACE | |
| 1 | POWER SAVING MODE | TRANSMISSION INTERVAL: 10 MINUTES | 4 | 7098 | DETAIL |
| 2 | IN OPERATION | TRANSMISSION INTERVAL: 10 MINUTES TRANSMISSION STOP TIME ZONE 0:00~8:00 | 50 | 6019 | DETAIL |
| 3 | ERROR | TRANSMISSION INTERVAL: 10 MINUTES TRANSMISSION STOP TIME ZONE 0:00~8:00 | 30 | 6548 | DETAIL |
| 4 | UNKNOWN | TRANSMISSION INTERVAL: 10 MINUTES | 15 | 6724 | DETAIL |
| 5 | STOPPED | TRANSMISSION INTERVAL: 10 MINUTES | 10 | 6897 | DETAIL |

INFORMATION PROCESSING APPARATUS, METHOD, AND MEDIUM FOR MANAGING STATUS INFORMATION ABOUT AN IMAGE FORMING APPARATUS

BACKGROUND OF THE INVENTION

1. Field of the Invention

The present disclosure generally relates to imaging and, more particularly, to a technique for managing a history of jobs executed by an image forming apparatus as a job history.

2. Description of the Related Art

A conventional job history management system records and stores a job history in a database when image forming apparatuses such as a printer and a digital multifunction peripheral execute printing, copying, facsimile (FAX), electronic mail sending, and other jobs. For example, a job history stored in the database may include information about a user who executed the job, an execution date and time, information identifying the executing image forming apparatus (IP address and/or serial number), the type of the executed job, and information about an image and/or text of a document. A job history management agent for transmitting various types of information about an image forming apparatus to a server is installed on the image forming apparatus. The job history management agent transmits, along with a job history, status information about the image forming apparatus and the job history management agent itself to the server at regular intervals. The server manages the received status information. If the server has not received status information within the regular interval, the server determines that some error has occurred in the image forming apparatus, and notifies the error to an administrator of the image forming apparatus.

Some image forming apparatuses have a function of entering a power saving mode, in which a central processing unit (CPU) is brought into a suspended state to reduce power consumption, if not operated by a user for a certain time.

For example, Japanese Patent Application Laid-Open No. 2011-204027 discusses a system for managing power consumption of an image forming apparatus. A change in a power source state of the image forming apparatus is notified to a server at the timing of change in the power source state. The server records the time of shift of the power source state based on the notification from the image forming apparatus, and manages the power consumption.

According to Japanese Patent Application Laid-Open No. 2011-204027, the image forming apparatus issues the notification to the server at the timing when the power source state of the image forming apparatus changes. However, it is difficult to appropriately manage the status of the image forming apparatus by using such information alone.

The foregoing job history management agent can be used to acquire more detailed information about the image forming apparatus and more appropriately manage the status of the image forming apparatus. To transmit information about the image forming apparatus to the server by using the job history management agent, the CPU needs to be working and the image information apparatus is not able to enter the power saving mode. If the image forming apparatus has entered the power saving mode, the job history management agent is not able to transmit the status information. In such a case, the server may erroneously determine that some error has occurred in the image forming apparatus.

SUMMARY OF THE INVENTION

According to an aspect of the present disclosure, an image forming apparatus includes a first transmission unit configured to transmit job information about a job executed by the image forming apparatus to an external job history management unit configured to manage the job information as a job history, a control unit configure to perform control to prohibit entering a power saving mode when the first transmission unit transmits the job information, and permit entering the power saving mode when the first transmission unit does not transmit the job information, and a second transmission unit configured to transmit status information about the image forming apparatus to an external status information management unit configured to manage the status information at transmission timing with regular intervals, wherein the second transmission unit is configured not to transmit the status information if the image forming apparatus has entered the power saving mode, and wherein the second transmission unit is configured to, if the first transmission unit does not transmit the job information at the transmission timing of the status information by the second transmission unit, transmit status information indicating that the control unit permits entering the power saving mode to the status information management unit.

Further features and aspects of the present disclosure will become apparent from the following detailed description of exemplary embodiments with reference to the attached drawings.

BRIEF DESCRIPTION OF THE DRAWINGS

FIGS. 11A and 11B illustrate data configuration examples of status information the job history management agent 11 transmits.

FIG. 12 illustrates an example of a job history management agent list screen displayed when checking statuses of job history management agents 11.

DESCRIPTION OF THE EMBODIMENTS

Various exemplary embodiments, features, and aspects of the disclosure will be described in detail below with reference to the drawings.

Figure 1:
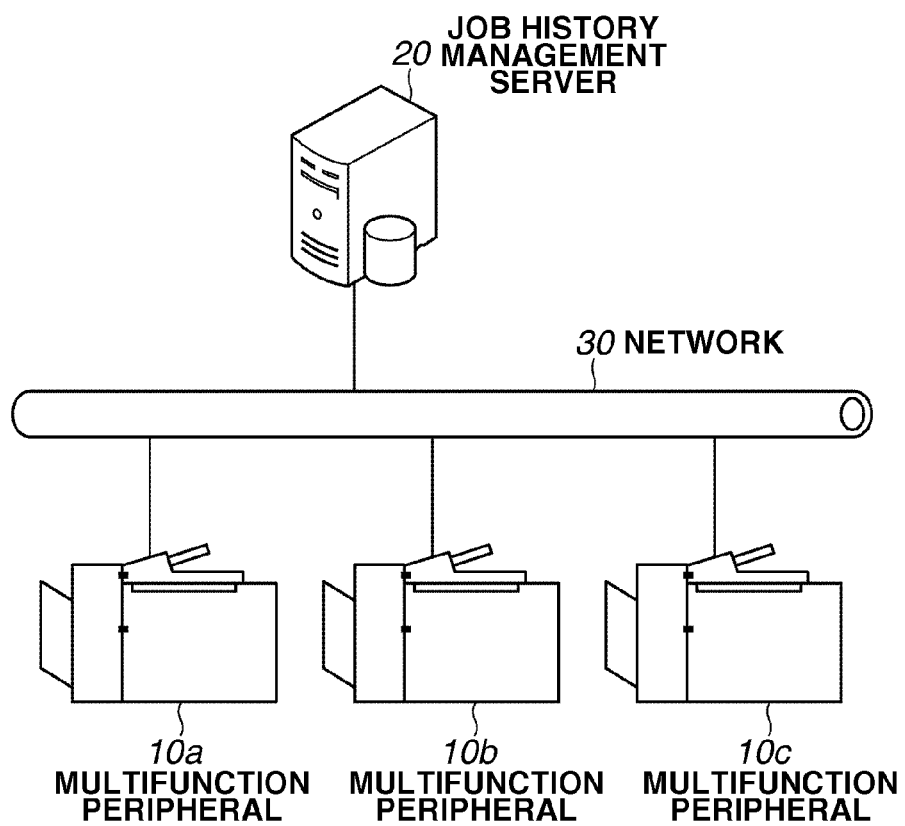
FIG. 1 is an overall configuration diagram illustrating a job history management system.

FIG. 1 is an overall configuration diagram illustrating a job history management system according to an exemplary embodiment of the present disclosure. In FIG. 1, digital multifunction peripherals 10a, 10b, and 10c (hereinafter, referred to as multifunction peripherals 10a, 10b, and 10c) and a job history management server 20 (hereinafter, referred to as a management server 20) are connected to a network 30. There may be a plurality of management servers 20.

The multifunction peripherals 10a, 10b, and 10c have functions such as scanning, printing, copying, electronic mail, and facsimile (FAX). The multifunction peripherals 10a, 10b, and 10c further have a function of recording a job history about a job executed on the respective multifunction peripherals 10a, 10b, and 10c simultaneously with the execution of the job. Since the multifunction peripherals 10a, 10b, and 10c have similar configurations and functions, the multifunction peripherals 10a, 10b, and 10b will hereinafter be referred to as multifunction peripherals 10. The job history includes the name of a user who executed the job, an execution date and time, an Internet Protocol (IP) address and/or a serial number of an image forming apparatus that executed the job, a type of the executed job, and/or image data generated from an image input to the multifunction peripheral 10.

The multifunction peripheral 10 is capable of installation of built-in applications, and provides an execution environment for the built-in applications. The built-in applications can be used to customize functions of the multifunction peripheral 10. In the present exemplary embodiment, a job history management agent 11 (hereinafter, referred to as an agent 11) is installed as a built-in application. The agent 11 has a function of transmitting a job history or histories recorded by the multifunction peripheral 10 to the management server 20. The agent 11 also transmits status information about the multifunction peripheral 10 and the agent 11 to the management server 20. The agent 11 is described below.

The multifunction peripheral 10 enters a power saving mode if not operated by a user for a certain time. The power saving mode refers to a state where a CPU 101 of the multifunction peripheral 10 is in a suspended state and the functions of the image forming apparatus are limited. If a multifunction peripheral 10 has entered the power saving mode, the built-in applications to be executed by using the CPU 101 of the multifunction peripheral 10 become not able to be activated. Bringing the CPU 101 into the suspended state can suppress power consumption. In the present exemplary embodiment, unlike the power saving mode, a state where the CPU 101 is activated and can execute a job will be referred to as a normal mode. A hardware configuration of the multifunction peripheral 10 is described below.

The management server 20 performs data conversion processing on the job histories from the agents 11, and stores and manages the results in a database 2007. Specifically, the data conversion processing refers to processing for performing optical character recognition (OCR) processing on image data to extract text information from the image data, and converting a format of the image data. The text information obtained by the data conversion processing is linked and stored with the job histories, and used when the user searches the job histories. The management server 20 accepts a search condition from the user, searches the job histories stored in the database 2007 for one(s) matching the search condition, and presents the acquired one(s) to the user. The search condition may include attribute information about a job, such as the executor of the job and the execution date and time, and a character string included in the text information. Using the specified search condition as a keyword, the management server 20 searches the job histories stored in the database 2007. The management server 20 further receives status information about the multifunction peripheral 10 and the agent 11 from the agent 11, and stores and manages the status information in the database 2007. The management server 20 checks whether the stored status information has been regularly updated, and presents the states of the multifunction peripherals 10 to the user.

The network 30 is a line for connecting the multifunction peripheral 10 and the management server 20 with each other. Examples of the network 30 include a local area network (LAN) operating within a company and a wide area network (WAN) covering a wide area over the Internet.

In FIG. 1, the functions of the management server 20 are implemented on one PC. However, servers having the respective functions, such as an image processing server, a data server, a search server, and a management server, may be implemented on a plurality of PCs in a distributed manner. Arbitrary combinations of such functions may be included in an arbitrary number of PCs. The number of multifunction peripherals 10 constituting the job history management system is not limited to three as illustrated in FIG. 1. The job history management system may be constituted by more or fewer multifunction peripherals 10. While the present exemplary embodiment is predicated on that the management server 20 includes the database 2007, a file system or other storage unit capable of storing job history information may be used instead.

Figure 2:
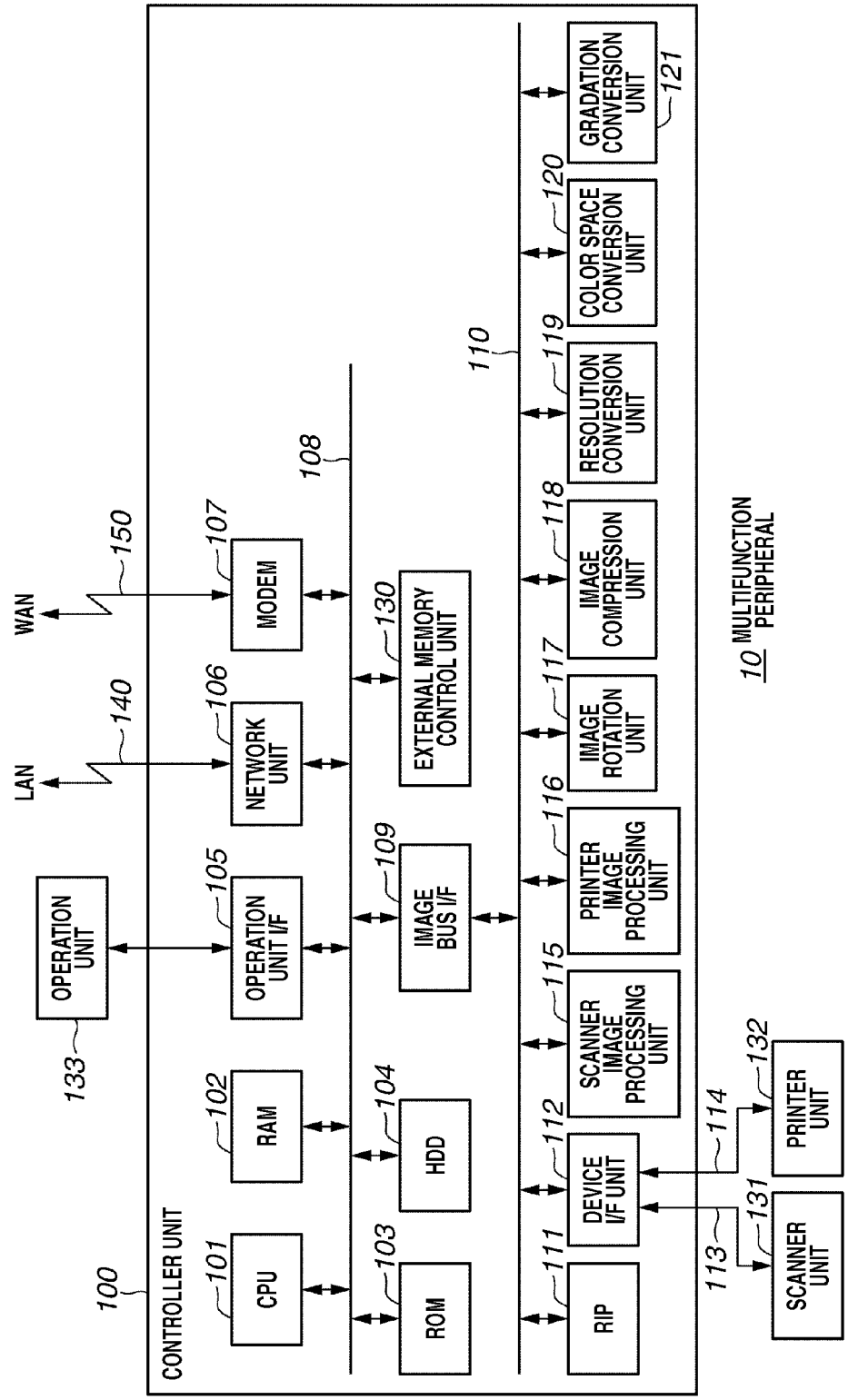
FIG. 2 is a block diagram illustrating a hardware configuration of a digital multifunction peripheral 10.

FIG. 2 is a block diagram illustrating a hardware configuration of a multifunction peripheral 10. A controller unit 100 is connected to a scanner unit 131 serving as an image input device and a printer unit 132 serving as an image output device. The controller unit 100 is also connected to a network (LAN) 140 and a public line (WAN) 150. The controller unit 100 thereby inputs and outputs image data and information to/from the multifunction peripheral 10. As used herein, the term "unit" generally refers to any combination of software, firmware, hardware, or other component that is used to effectuate a purpose.

The CPU 101 is a controller that executes programs and controls various types of processing to control components connected to a system bus 108. A random access memory (RAM) 102 is a memory for reading and writing data. The RAM 102 is used for various types of calculation processing of the CPU 101 and for the purpose of temporarily storing data. A read-only memory (ROM) 103 is a memory dedicated to data reading. The ROM 103 stores a system boot program. A hard disk drive (HDD) 104 stores system software, built-in application programs, and job history information. The CPU 101 loads the programs stored in the HDD 104 into the RAM 102 and executes the loaded programs. An operation unit interface (I/F) 105 is an interface unit with an operation unit 133. The operation unit I/F 105 outputs screen data to be displayed on the operation unit 133 to the operation unit 133. The operation unit I/F 105 also functions to transmit information input by the user from the operation unit 133 to the CPU 101. The operation unit 133 may be a screen arranged on the multifunction peripheral 10 or a screen (display 208) of a PC or other external device connected to the multifunction peripheral 10 via a network. A network unit (network) 106 is connected to the network (LAN) 140, and inputs and outputs information. A modem 107 is connected to the public line (WAN) 150, and inputs and outputs image data. Such devices are connected to the system bus 108.

An image bus I/F 109 is a bus bridge that connects the system bus 108 with an image bus 110 for transmitting image data at high speed, and converts data structures. The image bus 110 is connected with the following devices. A raster image processor (RIP) 111 rasterizes page description language (PDL) code into a bitmap image. A device I/F unit 112 connects the scanner unit 131 and the printer unit 132 serving as the image input/output devices to the controller unit 100 via an image input unit interface 113 and a printing unit interface 114, and converts image data. A scanner image processing unit 115 corrects, processes, and edits input image data. The scanner image processing unit 115 also has a function of determining whether input image data is a color document or a monochromatic document based on a saturation signal of the image data, and storing the result. A printer image processing unit 116 corrects, processes, and edits output image data. An image rotation unit 117 cooperates with the scanner image processing unit 115 to rotate image data simultaneously with the reading of an image from the scanner unit 131, and stores the rotated image data in the memory. The image rotation unit 117 can also rotate image data in the memory and store the rotated image data into the memory, or rotate and print out image data in the memory in cooperation with the printer image processing unit 116. An image compression unit 118 performs Joint Photographic Experts Group (JPEG) compression/decompression processing on multivalued image data, and Joint Bi-level Image Experts Group (JBIG), modified relative element address designate (MMR), modified relative element address designate (MR), and/or modified Huffman (MH) compression/decompression processing on binary image data. A resolution conversion unit 119 performs resolution conversion processing on image data in the memory and stores the resultant into the memory. A color space conversion unit 120 performs matrix calculations to convert, for example, YUV image data in the memory into Lab image data, and stores the converted image data into the memory. A gradation conversion unit 121 converts, for example, 8-bit 256-level image data in the memory into 1-bit 2-level image data by using an error diffusion processing technique, and stores the resulting image data into the memory. The image rotation unit 117, the image compression unit 118, the resolution conversion unit 119, the color space conversion unit 120, and the gradation conversion unit 121 can be connected for operation. For example, image rotation processing and resolution conversion processing of image data in the memory can be performed without the intermediary of the memory.

Figure 3:
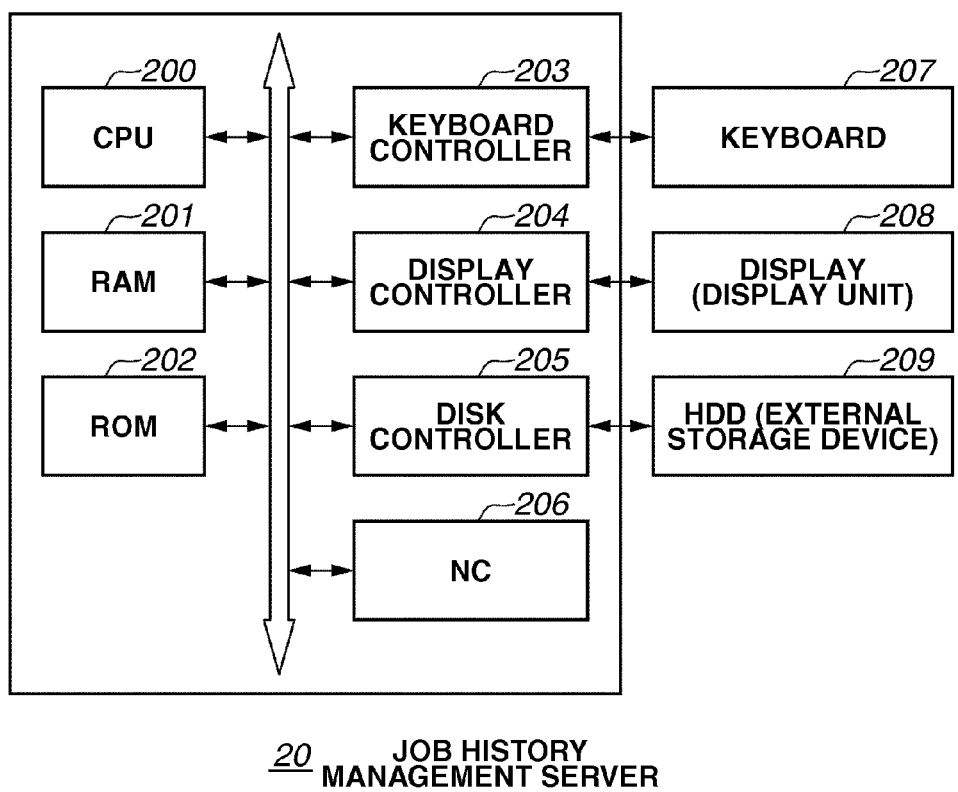
FIG. 3 is a hardware configuration diagram illustrating a personal computer (PC) constituting a job history management server 20.

FIG. 3 is a hardware block diagram of the PC that constitutes the management server 20. The hardware block diagram illustrated in FIG. 3 corresponds to a hardware block diagram of a typical information processing apparatus.

A CPU 200 executes programs such as an operating system and applications stored in a ROM 202 or loaded from a HDD (external storage device) 209 into a RAM 201. The CPU 200 executes the programs to implement processing of flowcharts to be described below. The RAM 201 is a memory for reading and writing data, and used for various types of calculation processing of the CPU 200 and for the purpose of temporarily storing data. The ROM 202 is a memory dedicated to data reading, and stores a system boot program. A keyboard controller 203 controls key inputs from a keyboard 207 and a pointing device (not illustrated). A display controller 204 controls display of various displays 208. A disk controller 205 controls data access to the HDD 209 that stores various types of data. A network controller (NC) 206 is connected to a network and performs communication control processing with other devices connected to the network. The keyboard 207 is a device for inputting characters and data to the information processing apparatus. The display 208 is a device for displaying the processing results of the information processing apparatus. The display (display unit) 208 may be a screen of the PC constituting the management server 20, or a screen (operation unit 133) arranged on a multifunction peripheral 10. The HDD 209 stores system programs of the operating system of the information processing apparatus and programs of the job history management system. The HDD 209 is also used as a temporary storage area during data processing.

Figure 4:
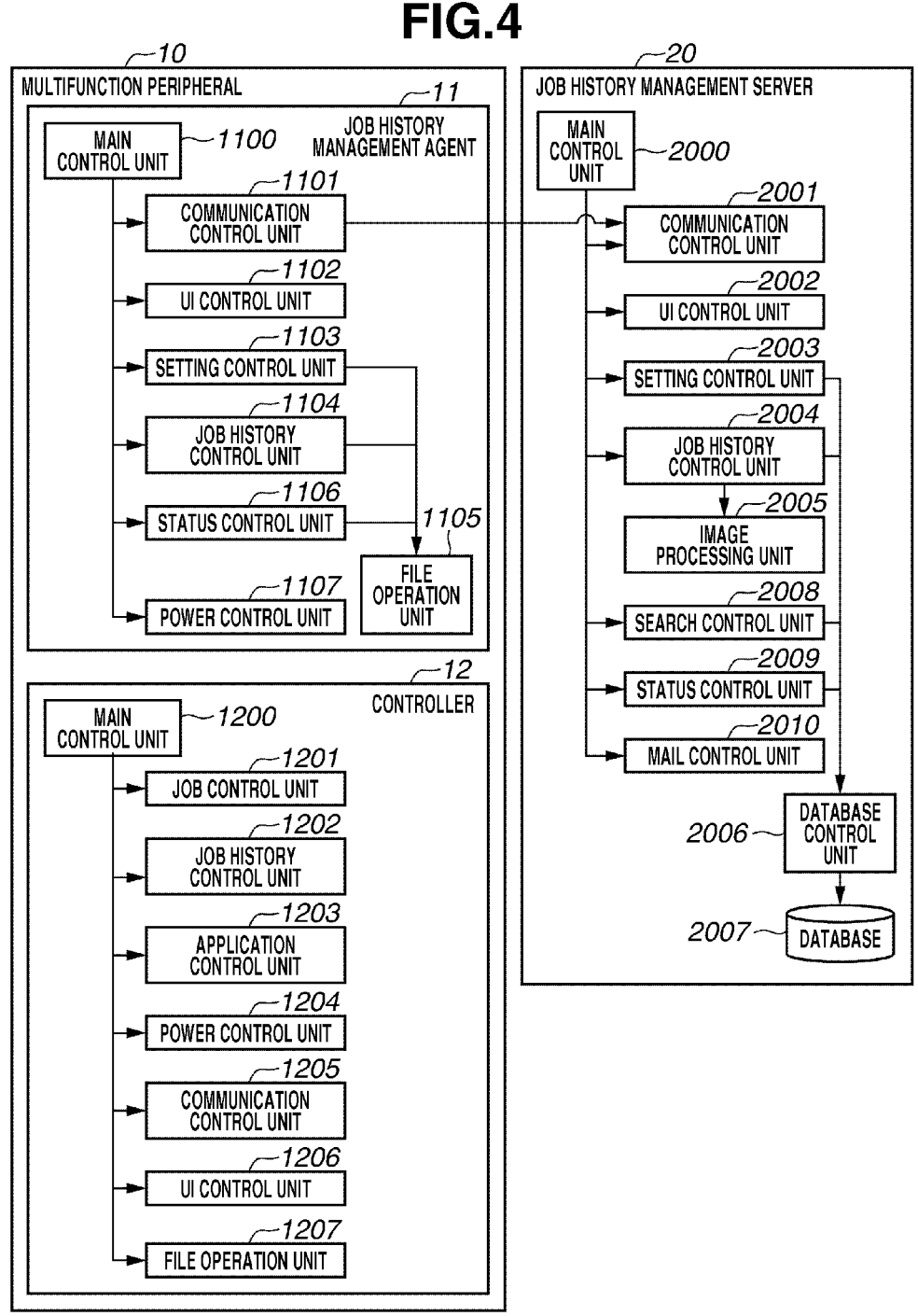
FIG. 4 is a block diagram illustrating an example of a software configuration of the multifunction peripheral 10 and the job history management server 20.

FIG. 4 is a block diagram illustrating an example of a software configuration of the multifunction peripheral 10 and the management server 20. The multifunction peripheral 10 includes a controller 12 and the agent 11.

The controller 12 is a program stored in the controller unit 100. The controller 12 controls the entire system of the multifunction peripheral 10. A job control unit 1201 executes a job based on an instruction received from the user via the operation unit 133 and the operation unit I/F 105. A job history control unit 1202 records a history of jobs executed by the job control unit 1201 as a job history, and stores the job history into the HDD 104.

An application control unit 1203 provides an execution environment for built-in applications. The application control unit 1203 performs control on installation, execution, and uninstallation of the built-in applications. The built-in applications installed by the application control unit 1203 are stored in the HDD 104. The stored built-in applications are loaded in the RAM 102 and executed. The built-in applications control the control units of the controller 12 via the application control unit 1203. The agent 11 according to the present exemplary embodiment is an example of the built-in applications.

A power control unit 1204 controls a power source of the multifunction peripheral 10. The power control unit 1204 controls ON/OFF of the power source of the multifunction peripheral 10. The power control unit 1204 further controls the power source so that the multifunction peripheral 10 shifts from the normal mode to the power saving mode and returns from the power saving mode to the normal mode. If the multifunction peripheral 10 has not been operated by the user for a certain time, the power control unit 1204 controls the power source so that the multifunction peripheral 10 automatically enters the power saving mode. The power control unit 1204 further performs power control based on a power control instruction from the installed built-in applications installed on the multifunction peripheral 10. Specifically, if an instruction to prohibit entering the power saving mode is given by one or more built-in applications, the power control unit 1204 controls the power source so that the multifunction peripheral 10 will not enter the power saving mode. If the multifunction peripheral 10 accepts from a built-in application a setting of a return time to return from the power saving mode to the normal mode, the power control unit 1204 controls the power source so that the multifunction peripheral 10 returns at the set time. The power control unit 1204 also issues a notification to the built-in application that set the return time.

A communication control unit 1205 controls communications of the multifunction peripheral 10 via the network unit (network) 106 and the modem 107. The communication control unit 1205 inputs and outputs information about image data based on an instruction accepted from the built-in applications via the job control unit 1201 and the application control unit 1203.

A user interface (UI) control unit 1206 controls an UI of the multifunction peripheral 10. The UI control unit 1206 accepts an instruction from the user via the operation unit 133 and the operation unit I/F 105. The UI control unit 1206 transmits an instruction to the built-in applications via the job control unit 1201 and the application control unit 1203. The UI control unit 1206 displays a screen instructed by a built-in application on the operation unit 133 via the job control unit 1201 and the application control unit 1203.

A file operation unit 1207 controls file operations of the multifunction peripheral 10. The file operation unit 1207 creates a file describing information about a job history and stores the file into the HDD 104 according to an instruction from a built-in application via the job control unit 1201, the job history control unit 1202, and the application control unit 1203. The file operation unit 1207 also updates and/or deletes a stored file or files.

The agent 11 is installed on the multifunction peripheral 10 as one of the built-in applications. The agent 11 transmits the status information about the multifunction peripheral 10 and the agent 11, and a history of jobs executed by the multifunction peripheral 10 to the management server 20. In the present exemplary embodiment, the agent 11 transmits the status information and the job history in an asynchronous manner.

A main control unit 1100 controls the entire agent 11 to issue instructions to and manage the components of the agent 11. Specifically, the main control unit 1100 issues a communication instruction to a communication control unit 1101, a setting control instruction to a setting control unit 1103 according to a user instruction accepted from a UI control unit 1102, and a job history control instruction to a job history control unit 1104.

The communication control unit 1101 transmits the job history, setting information, and the status information to a communication control unit 2001 of the management server 20. The communication control unit 1101 performs the transmission processing via the application control unit 1203 and the communication control unit 1205 of the controller 12.

The UI control unit 1102 generally controls processing related to user operations on the agent 11. Specifically, the UI control unit 1102 displays a UI screen on the operation unit 133 of the multifunction peripheral 10 via the application control unit 1203 and the UI control unit 1206 of the controller 12. The UI control unit 1102 also displays a UI screen on the display 208 of the PC constituting the management server 20 and/or a display of a PC (not illustrated) serving as an external device. The UI control unit 1102 passes instructions received from the user to the main control unit 1100.

The setting control unit 1103 controls setting information about the agent 11. The setting information refers to a schedule (transmission setting) according to which the agent 11 transmits a job history to the management server 20. The transmission setting of the job history is described below. The setting control unit 1103 accepts the user's instruction about the setting information from the UI setting unit 1102 via the main control unit 1100. When a UI control unit 2002 of the management server 20 to be described below accepts an instruction from the user, the management server 20 issues an instruction about the setting information to the setting control unit 1103 of the agent 11. Processing related to the user's instruction about the setting information is described below. The setting control unit 1103 refers to the setting information stored in the HDD 104 or stores the setting information via a file operation unit 1105. The setting control unit 1103 further transmits the setting information to the management server 20 via the main control unit 1100 and the communication control unit 1101.

The job history control unit 1104 acquires job histories from the job history control unit 1202 via the application control unit 1203 according to an instruction from the main control unit 1100. The job history control unit 1104 transmits the acquired job histories to the management server 20 via the communication control unit 1101. If the job history control unit 1104 has transmitted all the acquired job histories, the job history control unit 1104 updates the number of not-transmitted job histories in the status information stored in the HDD 104 to "0" via the file operation unit 1105. If the job history control unit 1104 has failed to transmit a job history, the job history control unit 1104 updates the status information to include information that indicates the failure of transmission of the job history. If the number of not-transmitted job histories changes, the job history control unit 1104 also updates the number of not-transmitted job histories. The job history control unit 1104 stores information about the time of the previous transmission of job histories (previous transmission time). When the job history control unit 1104 transmits job histories, the job history control unit 1104 updates the stored information about the previous transmission time. The information about the previous transmission time may be stored in the HDD 104 instead of the job history control unit 1104. In such a case, the job history control unit 1104 may acquire the information via the file operation unit 1105 when needed. Having acquired the information about the previous transmission time, the job history control unit 1104 determines whether the current time is a time when a certain interval has elapsed from the previous transmission time. The certain interval refers to a transmission interval 601 specified by the user from a transmission setting screen 600. The transmission interval 601 is stored in the HDD 104 as one of the pieces of setting information. The transmission setting screen 600 and the transmission interval 601 are described below. The job history control unit 1104 gives an instruction to the controller 12 via a power control unit 1107 so that the multifunction peripheral 10 will not enter the power saving mode during transmission of the job histories. The instruction that the power control unit 1107 gives to the controller 12 is described below.

The file operation unit 1105 is a control unit for inputting and outputting the setting information, the status information, the image data, and the job histories stored in the HDD 104 into/from files. The file operation unit 1105 performs processing on files describing various types of information stored in the HDD 104 according to instructions from the setting control unit 1103, the job history control unit 1104, and a status control unit 1106. The file operation unit 1105 inputs and outputs the files via the application control unit 1203 and the file operation unit 1207 of the controller 12.

The status control unit 1106 regularly acquires the status information about the multifunction peripheral 10 and the agent 11, and stores the status information into the HDD 104. The status control unit 1106 updates and deletes the status information stored in the HDD 104 via the file operation unit 1105. The status control unit 1106 transmits the status information stored in the HDD 104 to the management server 20 via the communication control unit 1101. The status control unit 1106 acquires the status information about the multifunction peripheral 10 from the job history control unit 1202 via the application control unit 1203. The status control unit 1106 acquires the status information about the agent 11 via the file operation unit 1105. The status information includes information about power control of the power control unit 1107. For example, the information about the power control includes information by which the agent 11 permits or prohibits the multifunction peripheral 10 entering the power save mode. The status information may include information about whether an error has occurred in the multifunction peripheral 10 or the agent 11, and information about whether the HDD 104 of the multifunction peripheral 10 has sufficient free space.

The power control unit 1107 performs power control on the multifunction peripheral 10 according to a state of processing that the agent 11 is performing. Examples of the power control include controlling power so that the multifunction peripheral 10 enters the power saving mode, and controlling power to prohibit entering the power saving mode. An instruction from the power control unit 1107 of the agent 11 is transmitted to the power control unit 1204 via the application control unit 1203 of the controller 12.

The management server 20 includes a main control unit 2000 that controls the entire management server 20 to issue instructions to and manage the following units.

The communication control unit 2001 receives the job histories, the setting information, and the status information from the communication control unit 1101 of the agent 11 via the communication control unit 1205 of the controller 12. The communication control unit 2001 transmits the received information to the control units of the management server 20.

The UI control unit 2002 displays a user interface on the display 208, and accepts instructions from the user via the keyboard 207 and the pointing device (not illustrated). The UI control unit 2002 transmits information (setting information) about a transmission setting specified by the user to a setting control unit 2003. The UI control unit 2002 transmits a search condition specified by the user to a search control unit 2008. The UI control unit 2002 displays a search result received from the search control unit 2008 on the display 208.

The setting control unit 2003 controls setting information about the management server 20 and the agent 11. The setting control unit 2003 receives the setting information from the user or the agent 11 via the main control unit 2000, and stores the received setting information into the database 2007.

A job history control unit 2004 accepts instructions to refer to and store the job histories from the user via the main control unit 2000, and manages the job histories according to the instructions.

An image processing unit 2005 performs OCR processing on the job histories and converts image formats according to an instruction from the job history control unit 2004.

A database control unit 2006 accepts instructions from the control units, and refers to and stores the setting information, the job histories, and the status information stored in the database 2007 of the HDD 104.

The database 2007 accepts an instruction from the database control unit 2006 and refers to and stores the setting information, the job histories, and the status information.

The search control unit 2008 accepts the user's search instruction from the UI control unit 2002 via the main control unit 2000, and controls search processing on the information stored in the database 2007. The search control unit 2008 searches the information stored in the database 2007 and acquires a search result based on a search condition received from the UI control unit 2002. The search control unit 2008 transmits the search result acquired from the database 2007 to the UI control unit 2002 via the main control unit 2000. The search control unit 2008 sorts search results if needed. For example, if the user issues a search instruction for the status of the multifunction peripheral 10, the search control unit 2008 searches the status information stored in the database 2007, and transmits the corresponding search result to the UI control unit 2002. If the user issues a search instruction for a history of jobs executed by the multifunction peripheral 10, the search control unit 2008 searches the job histories stored in the database 2007 and transmits the corresponding result to the UI control unit 2002.

A status control unit 2009 checks whether the multifunction peripheral 10 and the agent 11 are functioning normally, based on the status information received from the agent 11. For example, if the status information includes information indicating that the agent 11 has failed to transmit a job history, the status control unit 2009 displays the occurrence of an error on the display 208. For example, if the status information includes information indicating that the HDD 104 of the multifunction peripheral 10 may run out of free space, the status control unit 2009 displays the occurrence of an error on the display 208. The status control unit 2009 further monitors whether the status information has been regularly received. If the status information has failed to be received within a regular interval, the status control unit 2009 determines that the agent 11 is out of communication for some reason. For example, if the agent 11 is out of communication due to a network communication error, the status control unit 2009 sends a mail to the administrator of the agent 11, informing that the status is "unknown." The status control unit 2009 sends the mail via a mail control unit 2010. For example, if the multifunction peripheral 10 is in a state of being permitted to enter the power saving mode, the status control unit 2009 displays on the display 208 that the status is "the power saving mode."

The mail control unit 2010 sends a mail via the UI control unit 2002 if an error has occurred in any one of the multifunction peripheral 10, the agent 11, and the management server 20. The mail control unit 2010 sends the mail to a mail address designated by the user in advance.

Figure 5:
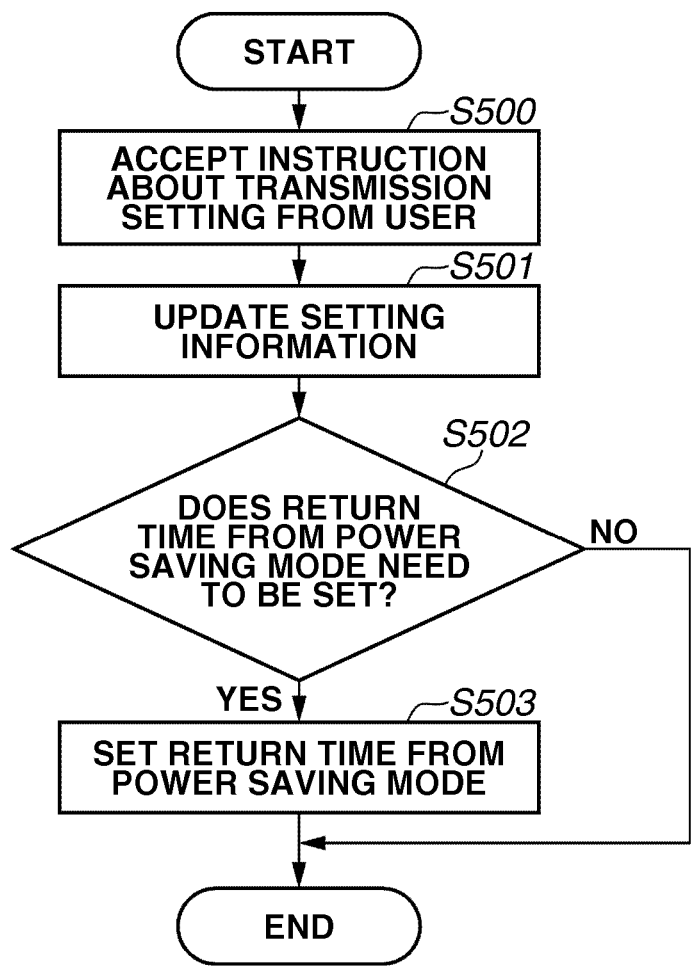
FIG. 5 is a flowchart illustrating transmission setting processing of a job history management agent 11 about a job history.

FIG. 5 is a flowchart illustrating processing related to the transmission setting of a job history for the agent 11 to transmit to the management server 20. The transmission setting processing in FIG. 5 starts when the user's instruction for the transmission setting is accepted. The CPU 101 reads a program of a built-in application stored in the HDD 104 and executes the following steps.

In step S500, the UI control unit 1102 of the agent 11 accepts an instruction about the transmission setting of a job history from the user via the operation unit 133, and transmits the accepted instruction to the setting control unit 1103. The instruction about the transmission setting includes a transmission interval and a transmission method of the job history. The transmission interval, the transmission method, and the transmission setting are described in detail below.

In step S501, the setting control unit 1103 updates the setting information stored in the HDD 104 based on the instruction received from the UI control unit 1102 in step S500. The setting control unit 1103 updates the setting information stored in the HDD 104 via the file operation unit 1105.

In step S502, the setting control unit 1103 determines whether a return time at which the multifunction peripheral 10 returns from the power saving mode needs to be set in the controller 12. If the setting control unit 1103 determines that the return time needs to be set (YES in step S502), the processing proceeds to step S503. If the setting control unit 1103 determines that the return time does not need to be set (NO in step S502), the setting control unit 1103 ends the transmission setting processing. For example, if the user has set a transmission stop time zone on the transmission setting screen 600 of the job history to be described below, the setting control unit 1103 determines that an end time of the transmission stop time zone, i.e., a transmission start time needs to be set as the return time. If the multifunction peripheral 10 has entered the power saving mode, the CPU 101 of the multifunction peripheral 10 may be in a suspended state at the time of transmission of the job history and fail to transmit the job history to the management server 20. Setting the return time allows the multifunction peripheral 10 to return from the power saving mode to the normal mode at the time of transmission of the job history and transmit the job history to the management server 20.

In step S503, the setting control unit 1103 sets the return time from the power saving mode. More specifically, the setting control unit 1103 sets the return time from the power saving mode into the power control unit 1204 of the controller 12 via the power control unit 1107 and the application control unit 1203.

In the present exemplary embodiment, the transmission setting of the job history is described to be performed by the agent 11. However, the management server 20 may perform the transmission setting. The agent 11 and the management server 20 each may perform the transmission setting of the job history. If the management server 20 manages the setting information, the setting information needs to be transmitted to the management server 20 after step S503. In step S500, the UI control unit 2002 of the management server 20 may display the transmission setting screen 600 on the display 208, accept the user's instruction about the transmission setting, and transmit the instruction to the setting control unit 1103.

Figure 6:
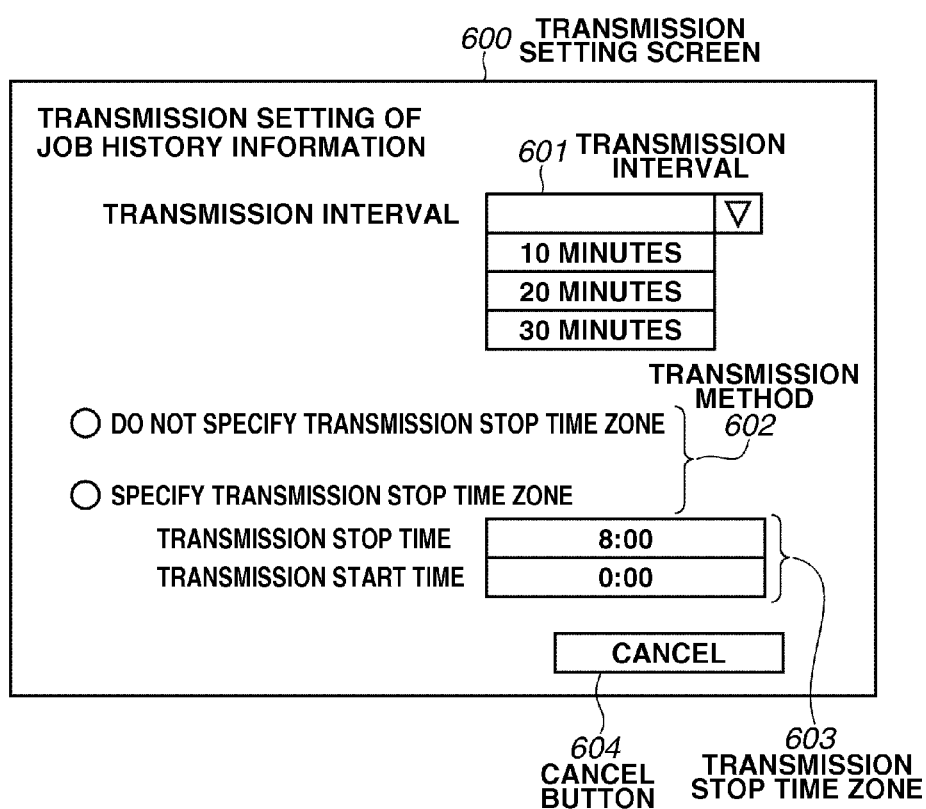
FIG. 6 illustrates an example of a transmission setting screen displayed when performing a setting about a method for transmitting a job history.

FIG. 6 illustrates an example of the transmission setting screen 600 which is displayed on the operation unit 113 or the display 208 to accept the user's instruction about the transmission method of the job history. The UI control unit 1102 of the agent 11 acquires information from the setting control unit 1103 and displays the transmission setting screen 600 on the display 208. Alternatively, the UI control unit 2002 of the management server 20 acquires information from the setting control unit 2003 and displays the transmission setting screen 600 on the display 208. The transmission setting of the job history includes a transmitting interval to transmit the job history at. If a transmission stop time zone not to transmit the job history is set, the transmission setting includes a transmission start time and a transmission stop time of the job history. A transmittable time zone is described below.

On the transmission setting screen 600, the user selects a transmission interval as a transmission setting of the job history. The transmission interval refers to a temporal interval from the completion of transmission of a job history to the time of the next transmission of a job history. For example, in FIG. 6, the user can select a transmission interval from alternatives of the transmission interval 601 including 10 minutes, 20 minutes, and 30 minutes. The transmission intervals selectable by the user are not limited to the example in FIG. 6. Instead of the drop-down menu, the alternatives of the transmission interval 601 may be all displayed on the transmission setting screen 600 and selected by the user.

On the transmission setting screen 600, the user specifies a transmission method 602 of the job history. For example, in FIG. 6, the user can select a transmission method "do not specify a transmission stop time zone" or "specify a transmission stop time zone." For example, if the user selects the transmission method "do not specify a transmission stop time zone," the agent 11 transmits job histories at transmission intervals selected by the transmission interval 601. For example, if the user selects the transmission method "specify a transmission stop time zone," the agent 11 transmits job histories at transmission intervals selected by the transmission interval 601 in a time zone other than the transmission stop time zone.

For the transmission stop time zone 603, the user sets the time zone not to transmit the job history. In FIG. 6, the user can specify a transmission stop time and a transmission start time to set the transmission stop time zone 603. The user may set a transmittable time zone for transmitting the job history instead of the transmission stop time zone. Hereinafter, the period from the transmission stop time to the transmission start time will be referred to as a "transmission stop time zone." The period from the transmission start time to the transmission stop time of the job history will be referred to as a "transmittable time zone." If the user selects a cancel button 604, the setting control unit 1103 cancels the setting about the transmission method of the job history.

Other than the transmission setting, the transmission setting screen 600 may be used to specify a type of the job history to transmit and a time zone to record a job history.

Figure 7:
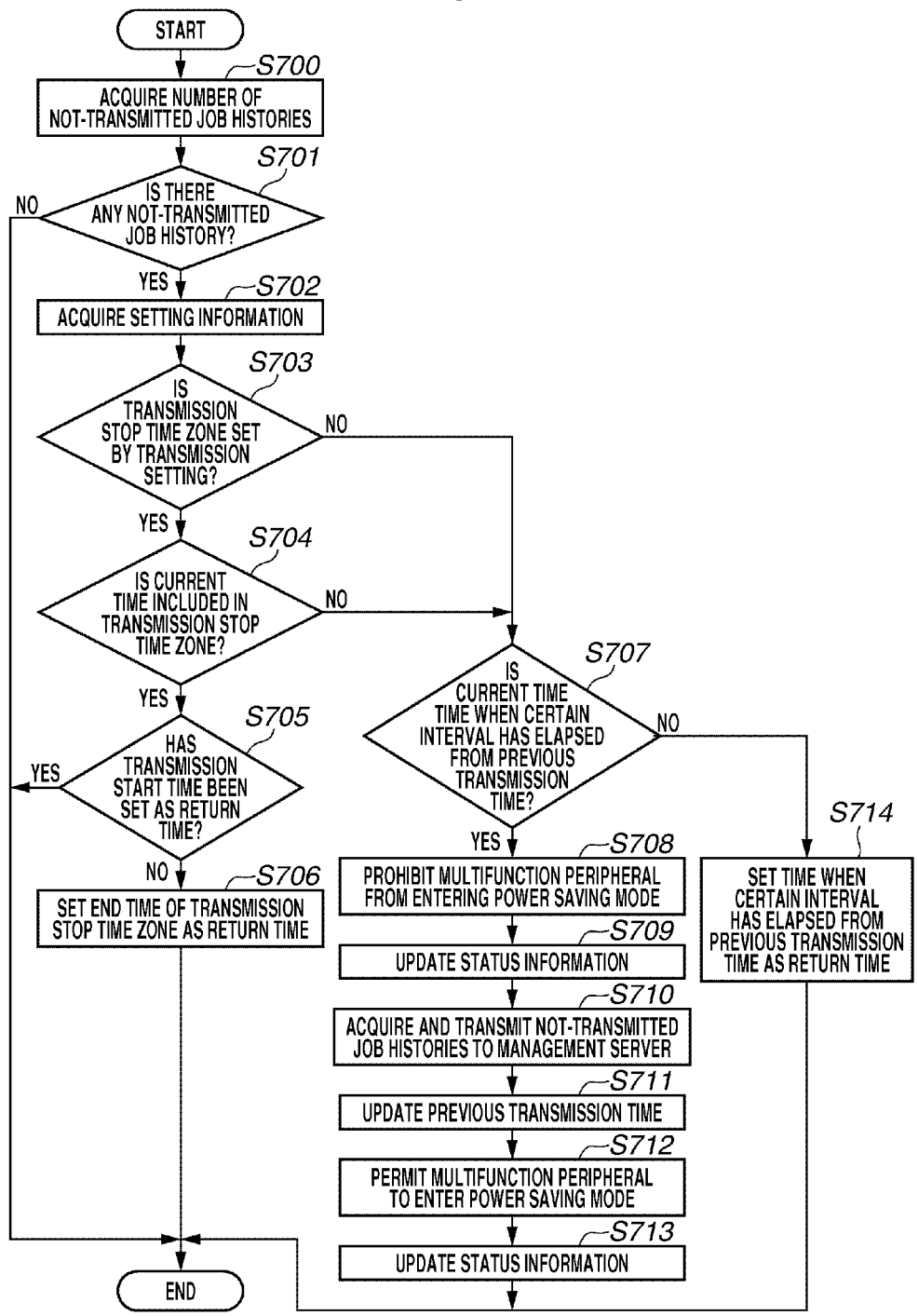
FIG. 7 is a flowchart illustrating job history transmission processing of the job history management agent 11 according to a first exemplary embodiment.

FIG. 7 is a flowchart illustrating job history transmission processing which the agent 11 performs on the management server 20. The CPU 101 reads a program of a built-in application stored in the HDD 104 and executes the following steps.

The job history transmission processing illustrated in FIG. 7 is performed at regular intervals while the agent 11 is activated. The activation of the agent 11 is triggered by an event notification with which the power control unit 1204 instructs the power control unit 1107 of the agent 11 to return when the controller 12 returns from the power saving mode to the normal mode. When the controller 12 is activated at the set return time, the power control unit 1204 performs the event notification to the agent 11 and the control units execute predetermined processing. Other triggers include when the user gives an instruction to execute a job. To perform the job history transmission processing at regular intervals, a timer is set to issue an event notification to the control units at set times.

In step S700, the job history control unit 1104 acquires the number of not-transmitted job histories from the controller 12. The job history control unit 1104 acquires the number of not-transmitted job histories from the job history control unit 1202 of the controller 12 via the application control unit 1203.

In step S701, the job history control unit 1104 determines whether there is any not-transmitted job history, based on the value of the number of not-transmitted job histories acquired in step S700. If the job history control unit 1104 determines that there is a not-transmitted job history or histories (YES in step S701), the processing proceeds to step S702. If the job history control unit 1104 determines that there is no not-transmitted job history (NO in step S701), the job history control unit 1104 ends the job history transmission processing.

In step S702, the job history control unit 1104 acquires the setting information from the setting control unit 1103. Here, the setting control unit 1103 acquires the setting information from the HDD 104 via the file operation unit 1105, and transmits the acquired setting information to the job history control unit 1104.

In step S703, the job history control unit 1104 determines whether a transmission stop time zone is set by the transmission setting of the job history, based on the setting information acquired in step S702. If the job history control unit 1104 determines that a transmission stop time zone is set by the transmission setting (YES in step S703), the processing proceeds to step S704. If the job history control unit 1104 determines that no transmission stop time zone is set by the transmission setting (NO in step S703), the processing proceeds to step S707.

In step S704, the job history control unit 1104 determines whether the current time is included in the transmission stop time zone. If the job history control unit 1104 determines that the current time is included in the transmission stop time zone (YES in step S704), the processing proceeds to step S705. If the job history control unit 1104 determines that the current time is not included in the transmission stop time zone (NO in step S704), the processing proceeds to step S707.

In step S705, the job history control unit 1104 determines whether the transmission start time of a job history has been set as a return time. To determine whether a return time has been set, the job history control unit 1104 inquires of the power control unit 1204 of the controller 12. To determine whether a return time has been set, the job history control unit 1104 or the setting control unit 1103 may store information about a set return time in the HDD 104 and make an inquiry about the information. If the job history control unit 1104 determines that the transmission start time of a job history has been set as a return time (YES in step S705), the job history control unit 1104 ends the transmission processing. If the job history control unit 1104 determines that the transmission start time has not been set as a return time (NO in step S705), the processing proceeds to step S706.

In step S706, the job history control unit 1104 sets the end time of the transmission stop time zone as a return time at which the multifunction peripheral 10 returns from the power saving mode. Specifically, the return time refers to the transmission start time of a job history. The job history control unit 1104 sets the return time into the power control unit 1204 via the power control unit 1107 of the agent 11 and the application control unit 1203 of the controller 12.

In step S707, the job history control unit 1104 determines whether the current time is a time when a certain interval has elapsed from the previous transmission time. The previous transmission time refers to the date and time when the agent 11 completed transmitting a job history or histories to the management server 20. The certain interval refers to the transmission interval 601 set by the user on the transmission setting screen 600. In the present exemplary embodiment, the previous transmission time is information stored in the job history control unit 1104. The information may be stored in the HDD 104 instead. If the job history control unit 1104 determines that the current time is a time when the certain interval has elapsed from the previous transmission time (YES in step S707), the processing proceeds to step S708. If the job history control unit 1104 determines that the current time is not a time when the predetermined interval has elapsed from the previous transmission time (NO in step S707), the processing proceeds to step S714.

In step S708, the job history control unit 1104 issues an instruction to prohibit the multifunction peripheral 10 from entering the power saving mode. The job history control unit 1104 issues the instruction to prohibit entering the power saving mode to the power control unit 1204 of the controller 12 via the power control unit 1107 and the application control unit 1203. Receiving the instruction of prohibition, the power control unit 1204 controls the power of the multifunction peripheral 10 so that the multifunction peripheral 10 will not enter the power saving mode.

In step S709, the job history control unit 1104 updates the status information to indicate that the status of the agent 11 is "prohibit entering the power saving mode." The job history control unit 1104 updates the status information stored in the HDD 104 via the file operation unit 1105. The status information that the status control unit 1106 subsequently transmits to the management server 20 includes the information "prohibit entering the power saving mode" until the job history control unit 1104 issues an instruction to permit entering the power saving mode to the multifunction peripheral 10. The status information to be transmitted to the management server 20 is described below.

In step S710, the job history control unit 1104 acquires and transmits a not-transmitted job history or histories to the management server 20. The job history control unit 1104 acquires the not-transmitted job histories from the job history control unit 1202 via the application control unit 1203 of the controller 12. The job history control unit 1104 transmits the acquired job histories to the management server 20 via the communication control unit 1101. The job history control unit 1104 performs the transmission processing in units of job histories, and transmits all the job histories stored in the HDD 104 of the multifunction peripheral 10. The job history control unit 1202 of the controller 12 deletes successfully-transmitted job histories according to an instruction from the job history control unit 1104. The job history control unit 1202 may delete successfully-transmitted job histories alone, and may delete transmission-failed job histories after successfully transmitted. The job history control unit 1202 need not delete the job histories stored in the HDD 104 immediately after the transmission of the job histories. The job history control unit 1202 may receive information from the job history control unit 1104 that job histories have been successfully transmitted, store the information, and collectively delete the job histories after the end of the transmission processing in FIG. 8.

In step S711, the job history control unit 1104 updates the previous transmission time with the date and time when the job history transmission processing has been completed in step S710.

In step S712, the job history control unit 1104 issues an instruction to permit the multifunction peripheral 10 entering the power saving mode. The job history control unit 1104 issues the instruction to permit entering the power saving mode to the power control unit 1204 via the power control unit 1107 of the agent 11 and the application control unit 1203 of the controller 12. Accepting the instruction of permission, the power control unit 1204 controls the power of the multifunction peripheral 10 to permit the multifunction peripheral 10 entering the power saving mode.

In step S713, the job history control unit 1104 updates the status information to indicate that the status of the agent 11 is "permit entering the power saving mode." Like step S709, the job history control unit 1104 updates the status information stored in the HDD 104 via the file operation unit 1105. The status information about the agent 11 to be subsequently transmitted to the job history management server 20 at regular intervals includes the status information "permit entering the power saving mode" until the job history control unit 1104 issues an instruction to prohibit entering the power saving mode to the multifunction peripheral 10.

In step S714, the job history control unit 1104 sets a time when the certain interval has elapsed from the previous transmission time as a return time from the power saving mode. The job history control unit 1104 sets the return time into the power control unit 1204 of the controller 12 via the power control unit 1107 and the application control unit 1203. Even if the user makes no operation after the entry of the multifunction peripheral 10 into the power saving mode, the multifunction peripheral 10 returns to the normal mode when the set return time comes.

Figure 8:
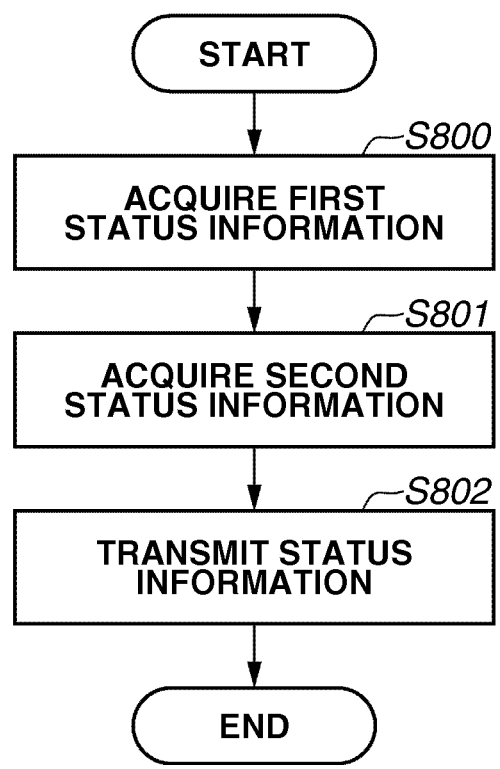
FIG. 8 is a flowchart illustrating status information transmission processing of the job history management agent 11.

FIG. 8 is a flowchart illustrating status information transmission processing of the agent 11. The CPU 101 reads a program of a built-in application stored in the HDD 104 and performs the following steps. The status information transmission processing is processing to be regularly performed. The agent 11 also irregularly performs the status information transmission processing when an error has occurred in the multifunction peripheral 10. To regularly perform the status information transmission processing, a timer is set to issue an event notification at set times, and the control units perform predetermined processing.

In step S800, the status control unit 1106 acquires first status information from the job history control unit 1202 via the application control unit 1203 of the controller 12. The first status information includes the total capacity of the job histories stored in the HDD 104 of the multifunction peripheral 10, the use capacity of the HDD 104, the number of job histories yet to be transmitted to the management server 20, and error information about the multifunction peripheral 10 and/or the agent 11.

In step S801, the status control unit 1106 acquires second status information via the file operation unit 1105. The second status information includes information about whether the multifunction peripheral 10 is in a power saving mode entry prohibited state or a power saving mode entry permitted state. The second status information may include information that a setting change that needs rebooting of the multifunction peripheral 10 has been made. The status information about the agent 11 may be stored in the RAM 102 of the multifunction peripheral 10.

In step S802, the status control unit 1106 transmits the status information to the management server 20. The status control unit 1106 transmits the status information to the communication control unit 2001 of the management server 20 via the communication control unit 1101 of the agent 11. The status information to be transmitted is the combination of the first status information and the second status information. The status information is described below. In the present exemplary embodiment, the status control unit 1106 transmits the combination of the first status information and the second status information to the management server 20. However, in steps S800 and S801, the status control unit 1106 may transmit the respective pieces of status information to the management server 20 immediately after the acquisition.

Figure 9:
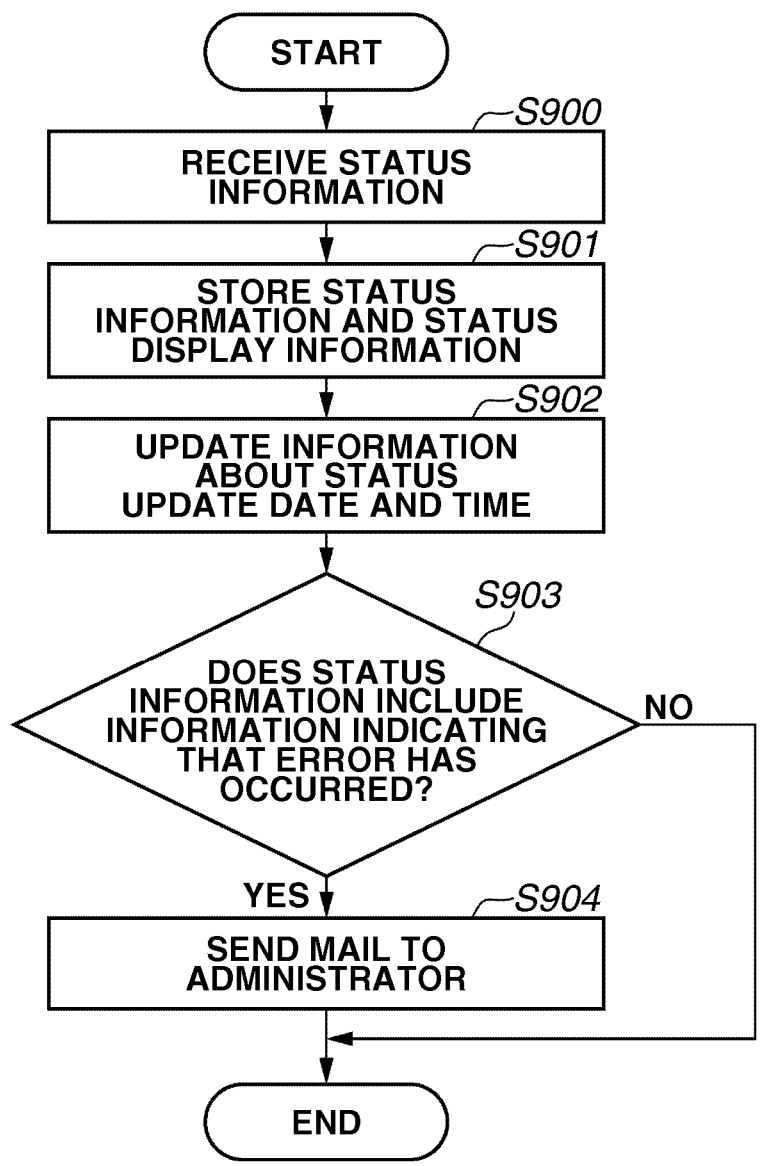
FIG. 9 is a flowchart illustrating status information reception processing of the job history management server 20.

FIG. 9 is a flowchart illustrating status information reception processing of the management server 20. The CPU 200 reads a program of the job history management system stored in the HDD (external storage device) 209 and performs the following steps. The status information reception processing starts when the management server 20 receives the status information from the multifunction peripheral 10.

In step S900, the communication control unit 2001 receives the status information from the communication control unit 1101 of the agent 11 via the communication control unit 1205 of the controller 12.

In step S901, the status control unit 2009 stores the status information and status display information into the database 2007 via the database control unit 2006. The status display information is information generated based on the status information received in step S900. The status display information may include "stop," "error," "in operation," "unknown," and "power saving mode." Based on such status display information, a status is displayed on a job history management agent list screen 1500 (hereinafter, referred to as a list screen 1500) illustrated in FIG. 12. For example, if the received status information includes status information "stop," the status control unit 2009 stores status display information "stop" into the database 2007, whereby a status "stop" is displayed on the list screen 1500. The list screen 1500 is described below.

In step S902, the status control unit 2009 updates information about a status update date and time stored in the database 2007 via the database control 2006 with the date and time when the status information was received in step S900. The status update date and time refers to the date and time when the management server 20 has completed receiving the status information from the agent 11.

In step S903, the status control unit 2009 determines whether the received status information includes information indicating that an error has occurred in the multifunction peripheral 10 or the agent 11. If the status control unit 2009 determines that the status information includes the information indicating that an error has occurred (YES in step S903), the processing proceeds to step 904. If the status control unit 2009 determines that the status information includes no information indicating that an error has occurred (NO in step S903), the status control unit 2009 ends the reception processing.

In step S904, the status control unit 2009 sends a mail to the administrator of the agent 11 via the mail control unit 2010, and ends the status information reception processing. The mail to the administrator includes a description of the error having occurred in the multifunction peripheral 10 or the agent 11.

Figure 10:
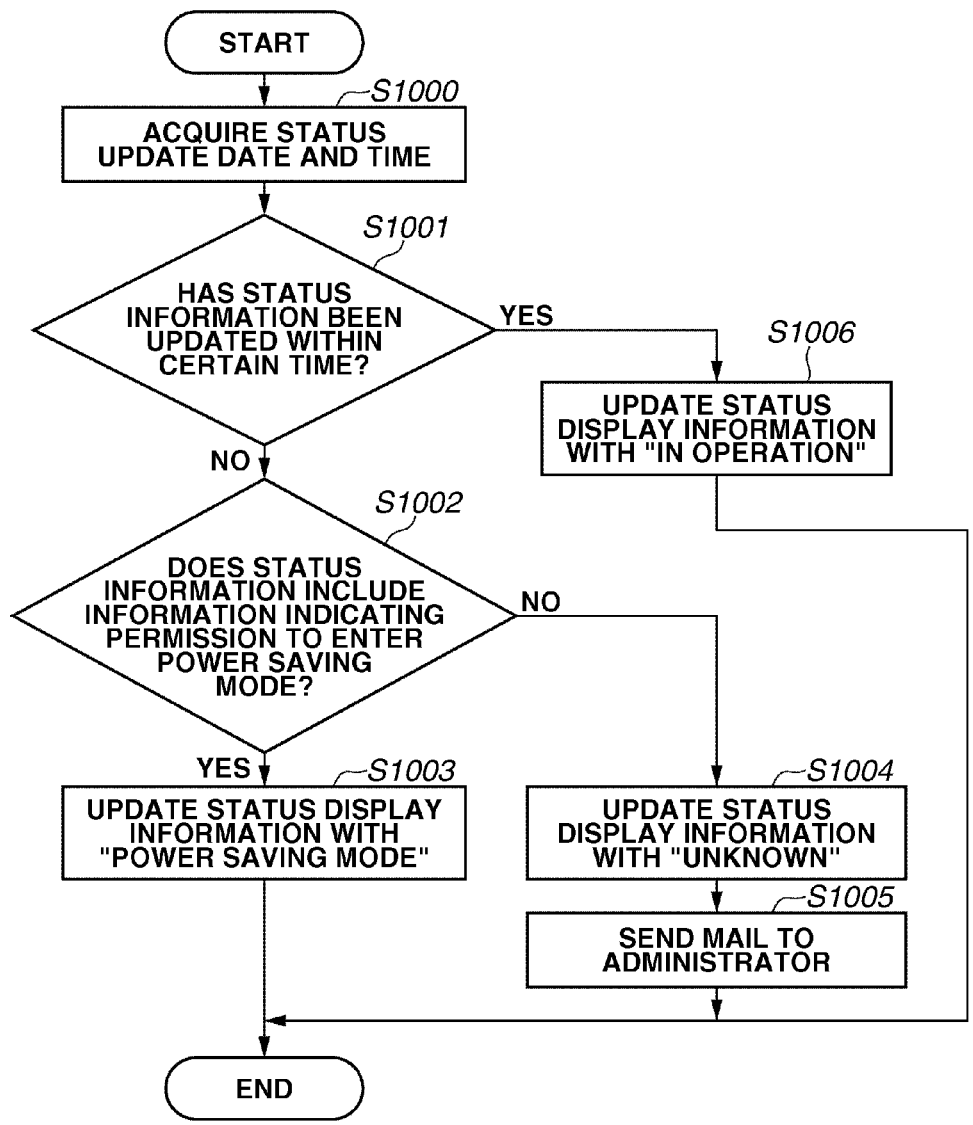
FIG. 10 is a flowchart illustrating live status check processing of the job history management agent 11 by the job history management server 20.

FIG. 10 is a flowchart illustrating live status check processing of the agent 11 by the management server 20. The CPU 200 reads a program of the job history management system stored in the HDD (external storage device) 209 and performs the following steps. The live status check processing is processing for checking whether the status information transmitted from the agent 11 has been successfully received by the management server 20. To regularly perform the live status check processing, a timer is set to issue an event notification at each set time, and the control units perform predetermined processing.

In step S1000, the status control unit 2009 acquires the status update date and time stored in the database 2007 via the database control unit 2006. As described above, the status update date and time refer to the date and time when the management server 20 has completed receiving the status information.

In step S1001, the status control unit 2009 compares the current time with the status update date and time acquired in step S1000 to determine whether the status information has been updated within a certain time set in advance by the administrator from the status update date and time. For example, if the set time is 15 minutes, the status control unit 2009 determines whether the status information has been updated within 15 minutes from the previous status update date and time. If the status control unit 2009 determines that the status information has not been updated within the certain time set by the administrator (NO in step S1001), i.e., if the management server 20 has received no status information for the certain time, the processing proceeds to step S1002. If the status information is determined to have been updated within the certain time (YES in step S1001), the processing proceeds to step S1006.

In step S1002, the status control unit 2009 refers to the status information stored in the database 2007 and determines whether the status information includes information indicating permission to enter the power saving mode. The status information stored in the database 2007 is the last status information that the management server 20 has received from the multifunction peripheral 10. If the status control unit 2009 determines that the information about the permission to enter the power saving mode is included (YES in step S1002), the processing proceeds to step S1003. If the status control unit 2009 determines that the information about the permission to enter the power saving mode is not included (NO in step S1002), the processing proceeds to step S1004.

In step S1003, the status control unit 2009 generates status display information "power saving mode" based on the status information, and updates the status display information stored in the database 2007. The status control unit 2009 updates the status display information of the database 2007 via the database control unit 2006.

In step S1004, the status control unit 2009 generates status display information "unknown" based on the status information, and updates the status display information stored in the database 2007. The status "unknown" means that there is an error unknown to the management server 20. For example, if an error occurs that the agent 11 fails to perform network communication, the management server 20 is not able to receive the status of the agent 11. Such a status is "unknown."

In step S1005, the status control unit 2009 sends a mail to the administrator of the agent 11 via the mail control unit 2010. The mail to be sent here includes information indicating that no status information has been received from the agent 11 within a certain interval. Receiving the mail, the administrator can check the state of the multifunction peripheral 10, the state of the agent 11, and the state of the network based on the information included in the mail.

In step S1006, the status control unit 2009 generates status display information "in operation" based on the status information, and updates the status display information stored in the database 2007.

FIGS. 11A and 11B illustrate data configuration examples of status information 1400 indicating the status of the agent 11, which the agent 11 transmits to the management server 20. FIGS. 11A and 11B include similar configurations other than the status "Status" of the agent 11 to be described below. Similar components will be designated by the same reference numerals. In the present exemplary embodiment, the status control unit 1106 of the agent 11 generates information such as illustrated in FIGS. 11A and 11B in the form of an Extensible Markup Language (XML) file. The status control unit 1106 transmits the generated XML file by using a communication protocol such as Simple Object Access Protocol (SOAP). The communication protocol is not limited to SOAP. Information about similar contents may be transmitted during the same session instead.

An element <AgentProperty> 1401 includes information about the agent 11 (an agent identifier (ID) individually assigned to each agent 11). Specifically, the element <AgentProperty> 1401 includes information about the multifunction peripheral 10 (the total capacity of the HDD 104 of the multifunction peripheral 10) and intervals to check the status of the agent 11.

An element <AgentStatus> 1402 includes status information indicating the status of the agent 11. The status information includes the used capacity "UsedAgentDiskSpace" and free space "FreeDiskSpace" of the HDD 104 in which job histories are recorded. The status information further includes "RemainderJobCount," i.e., the number of job histories yet to be transmitted to the management server 20, "LastRegistrationResult," i.e., a success or failure of transmission of the previous job history, and "Status," i.e., the status of the agent 11. The status "Status" of the agent 11 may include "Stop" (stop) and "Error" (error). The status "Status" may also include "EnablePowerSavingMode," i.e., permission to enter the power saving mode 1404, and "DisablePowerSavingMode," i.e., prohibition against entering the power saving mode 1405. In the present exemplary embodiment, the status of being prohibited from entering the power saving mode is expressed by "DisablePowerSavingMode." Instead, the tag of the element <AgentStatus> may be made blank to indicate the prohibition against entering the power saving mode. Alternatively, the tag of the element <AgentStatus> may be made blank to indicate the permission to enter the power saving mode while the prohibition against entering the power saving mode is expressed by "DisablePowerSavingMode."

An element <TransferSchedule> 1403 includes a transmission setting with which the agent 11 transmits a job history or histories to the management server 20. The transmission setting is described below. An element <TransferMode> numerically indicates a transfer setting as to whether to transmit job histories at regular intervals or at a fixed time. For example, the element <TransferMode> is set to "1" when job histories are transmitted at regular intervals. The numerical value indicating the transmission setting is not limited to the foregoing. An element "TransferInterval" indicates transmission intervals of job histories. In FIGS. 11A and 11B, the element <TransferInterval> is set to intervals of 10 minutes. An element <TransferEndTime> indicates a transmission stop time of job histories. An element <TransferStartTime> indicates a transmission start time of job histories.

The status information 1400 may include status information other than the information described in the present exemplary embodiment.

FIG. 12 illustrates the list screen 1500 that is displayed on the display 208 when the user checks the statuses of the agents 11. The UI control unit 2002 of the management server 20 acquires information from the status control unit 2009 and displays the list screen 1500 on the display 208.

An agent ID 1501 displays the IDs uniquely assigned to the agents 11.

A status 1502 displays the status information about the agents 11 updated by the processing in FIGS. 9 and 10. The types of the status information include "stopped," "power saving mode," "unknown," "error," and "in operation." For example, the agent 11 having an agent ID of "1" is exemplified. The agent 11 has a status "power saving mode," which means that the management server 20 has received the status information including the permission to enter the power saving mode 1404 from the agent 11 as illustrated in FIG. 11A and has received no status information for a certain time since then.

A transmission setting 1503 displays the transmission settings of job histories set in FIG. 5, 6, or 7. If the user has set the transmission method of not specifying a transmission stop time zone by the transmission setting, the UI control unit 2002 displays a transmission interval in the transmission setting 1503. On the other hand, if the user has set a transmission stop time zone, the UI control unit 2002 displays a transmission interval and the transmission sop time zone in the transmission setting 1503. If a transmittable time zone is set instead of a transmission stop time zone, the UI control unit 2002 displays a transmission interval and the transmittable time zone.

The number of not-transmitted job histories 1504 displays the numbers of job histories stored in the HDDs 1104 of the multifunction peripherals 10. The number of not-transmitted job histories 1504 indicates the numbers of job histories yet to be transmitted to the management server 20.

A free space 1505 indicates the free space of the HDDs 104 of the multifunction peripherals 10.

When the user presses a detail button 1506, the UI control unit 2002 displays detailed status information about the corresponding agent 11. The detailed status information refers to detailed information about the status displayed in the status 1502. For example, when the user presses a detail button 1506, the UI control unit 2002 displays the result whether job histories of the agent 11 have been successfully transmitted. If the status 1502 indicates an error, the UI control unit 2002 displays details of the error when the detail button 1506 is pressed. The detailed status information may be displayed on a different screen. The detailed status information may be displayed on the list screen 1500. Detailed information of the status information may be displayed on the list screen 1500 without the provision of the detail buttons 1506.

According to the first exemplary embodiment, the management server 20 can perform appropriate status management even if a multifunction peripheral 10 on which the agent 11 is installed has entered the power saving mode and the status information about the agent 11 managed by the management server 20 has not been updated within a certain interval.

A second exemplary embodiment is similar to the foregoing first exemplary embodiment in the configurations illustrated in FIGS. 1 to 6 and FIGS. 8 to 10. Similar parts to those of the first exemplary embodiment are designated by the same reference numerals. A description thereof will be omitted. The following description deals only with differences from the foregoing first exemplary embodiment.

Figure 13:
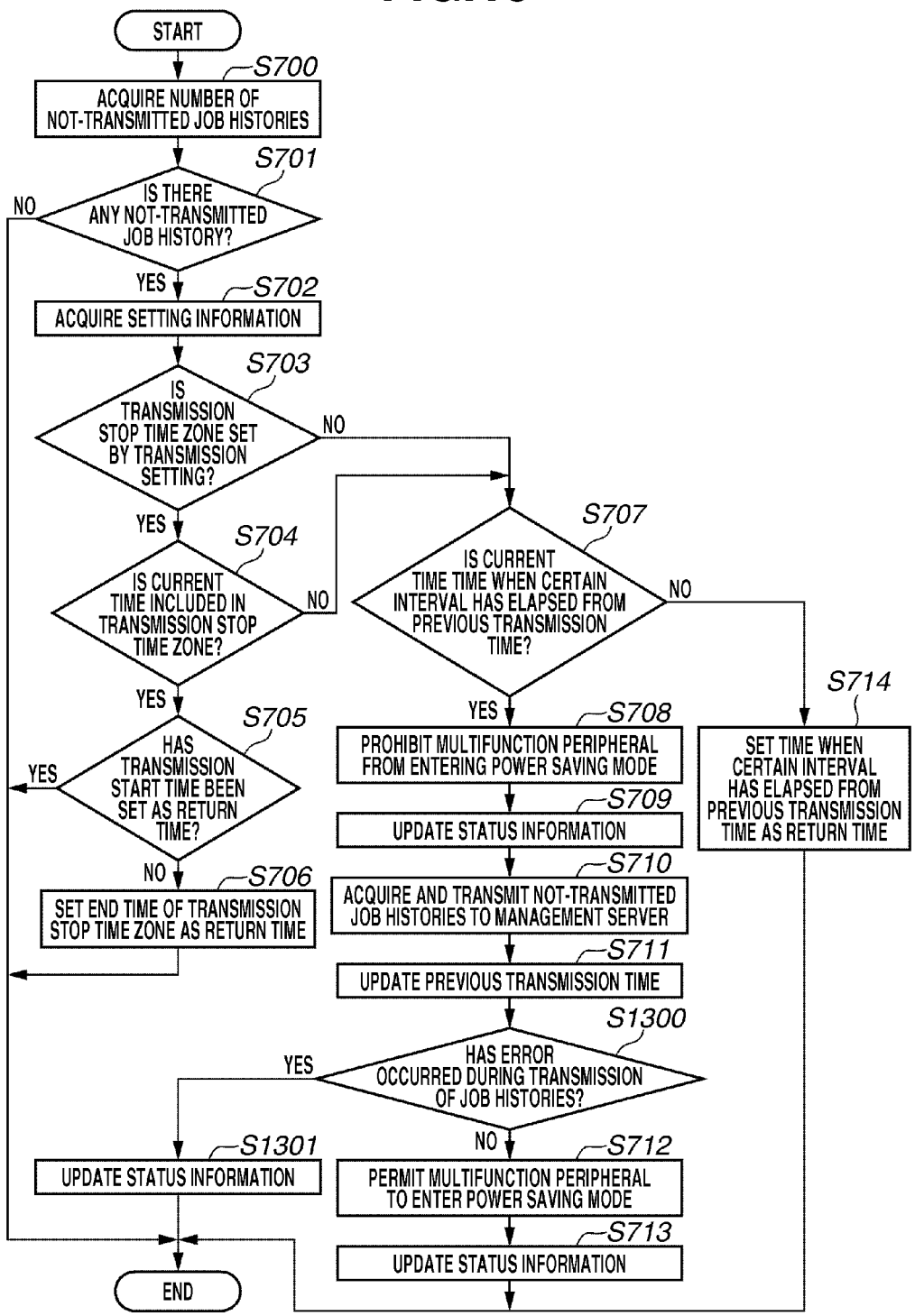
FIG. 13 is a flowchart illustrating job history transmission processing of the job history management agent 11 according to a second exemplary embodiment.

FIG. 13 is a flowchart illustrating a flow of job history transmission processing of the agent 11 according to the second exemplary embodiment. The steps in FIG. 13 correspond to those illustrated with the same reference numerals in FIG. 7, whereas the flowcharts are different in configuration. Specifically, new processing for determining whether an error has occurred during transmission of job histories is interposed between steps S711 and S712.

In step S710, when the management server 20 returns a response indicating that the management server 20 has successfully received job histories, the agent 11 determines that the job histories have been successfully transmitted. However, if an error occurs during the transmission of the job histories, the management server 20 will not return such a response. For example, if the management server 20 has failed to receive a job history due to an error on the management server 20 side, the management server 20 will not return the response indicating that the management server 20 has successfully received the job history. In such a case, the agent 11 determines that an error has occurred during the transmission of the job history. For example, suppose that the agent 11 fails to normally transmit a job history due to disconnected network communication. In such a case, the management server 20 will not return the response indicating that the management server 20 has successfully received the job history. The agent 11 thus determines that an error has occurred during the transmission of the job history.

In the second exemplary embodiment, if an error has occurred during the transmission of a job history (YES in step S1300), then in step S1301, the job history control unit 1104 updates the status information. The job history control unit 1104 then maintains the status of being prohibited from entering the power saving mode without issuing an instruction to permit entering the power saving mode to the multifunction peripheral 10.

The CPU 101 reads a program stored in the ROM 103 or the HDD 104 and performs the following steps.

In step S1300, the job history control unit 1104 determines whether an error has occurred during the transmission of job histories in step S710. As described above, if the response indicating that the job histories have been successfully received has been returned from the management server 20 after the transmission of the job histories in step S710, the job history management unit 1104 determines that no error has occurred during the transmission of the job histories. If the response has not been returned, the job history control unit 1104 determines that an error has occurred during the transmission of the job histories. If the job history control unit 1104 determines that an error has occurred during the transmission of the job histories (YES in step S1300), the processing proceeds to step S1301. If the job history control unit 1104 determines that no error has occurred during the transmission of the job histories (NO in step S1300), the processing proceeds to step S712 and subsequently performs the same processing as in the first exemplary embodiment.

In step S1301, the job history control unit 1104 includes information indicating that an error has occurred during the transmission of the job histories into the status information, and updates the status information stored in the HDD 104. Specifically, the job history control unit 1104 updates "LastRegistrationResult" (previous transmission result) in the status 1502 of the agent 11 illustrated in FIG. 12 to "Failure" which indicates a failure. The job history control unit 1104 updates the status information stored in the HDD 104 via the file operation unit 1105. The status information that the agent 11 subsequently transmits to the management server 20 includes the information indicating that an error has occurred during the transmission of the job histories until the error is resolved. If the management server 20 receives the status information including the information indicating that an error has occurred, the management server 20 sends a mail to the administrator of the multifunction peripheral 10 via the mail control unit 2010. The mail sent to the administrator includes a description of the error having occurred during the transmission of the job histories. After step S1301, the agent 11 ends the job history transmission processing.

In the first exemplary embodiment, the agent 11 performs the processing of steps S712 and S713 even if an error has occurred during transmission of a job history and the transmission is ended. If the management server 20 has received no status information for a certain interval, the management server 20 may thus erroneously determine that the multifunction peripheral 10 has entered the power saving mode instead of having encountered an error. In the second exemplary embodiment, the agent 11 performs different processing depending on whether an error has occurred during the transmission of job histories. The management server 20 can thus perform appropriate status management even if some error occurs while the agent 11 is transmitting job histories.

In both the first and second exemplary embodiments, the agent 11 issues an instruction to prohibit entering the power saving mode to the controller 12 while the job history control unit 1104 is transmitting job histories. The agent 11 issues an instruction to permit entering the power saving mode after the end of the transmission of the job histories. However, such instructions are not limited to the job history transmission processing, and may also be issued during processing in which other control units transit some information to an external device.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority from Japanese Patent Application No. 2012-195084 filed Sep. 5, 2012, which is hereby incorporated by reference herein in its entirety.

What is claimed is:

1. An information processing apparatus configured to manage status information about an image forming apparatus, the information processing apparatus comprising:
    a history management unit configured to manage job history information recorded by the image forming apparatus;
    an apparatus management unit configured to manage whether the image forming apparatus is permitted to enter a power saving mode;
    a reception unit configured to receive status information from the image forming apparatus;
    a determination unit configured to, if the reception unit has not received status information for a certain time period, determine that a status of the image forming apparatus is an unknown status or a status indicative of the power saving mode; and
    an output unit configured to, if the determination unit determines that the status of the image forming apparatus is the unknown status, output, to an administrator, information indicating that the status of the image forming apparatus is the unknown status,
    wherein if the determination unit determines that the status of the image forming apparatus is the status indicative of the power saving mode, an output of information to the administrator by the output unit is not performed.

2. The information processing apparatus according to claim 1, wherein the determination unit is configured to, if the reception unit has not received the status information for the certain time period and the status information last received from the image forming apparatus includes information indicating that the image forming apparatus is in a state of being permitted to enter the power saving mode, determine that the status of the image forming apparatus is the status indicative of the power saving mode, and
    wherein the determination unit is configured to, if the reception unit has not received the status information for the certain time period and the status information last received from the image forming apparatus includes information indicating that the image forming apparatus is in a state of being prohibited from entering the power saving mode, determine that the status of the image forming apparatus is the unknown status.

3. The information processing apparatus according to claim 1,
    wherein the history management unit is configured to manage the job history information sent from a transmission function of the image forming apparatus, and
    wherein the determination unit is configured to, if the status information includes information indicating that the image forming apparatus has failed to transmit job history information, determine that an error has occurred in the image forming apparatus.

4. The information processing apparatus according to claim 1, wherein the apparatus management unit is configured to, if the status information last received from the image forming apparatus includes information indicating that the image forming apparatus is in a state of being permitted to enter the power saving mode, manage that the image forming apparatus is permitted to enter the power saving mode.

5. The information processing apparatus according to claim 1, wherein the status information is configured to include any one of information indicating that the image forming apparatus is in operation, information indicating that the image forming apparatus is stopped, information indicating that an error has occurred, and information indicating that a status is unknown.

6. A method for an information processing apparatus configured to manage status information about an image forming apparatus, the method comprising:
    managing job history information recorded by the image forming apparatus;
    managing whether the image forming apparatus is permitted to enter a power saving mode;
    receiving status information from the image forming apparatus;
    if status information has not been received for a certain time period, determining that a status of the image forming apparatus is an unknown status or a status indicative of the power saving mode; and
    if the status of the image forming apparatus is determined to be the unknown status, outputting, to an administrator, information indicating that the status of the image forming apparatus is the unknown status,
    wherein if the status of the image forming apparatus is determined to be the status indicative of the power saving mode, an output of information to the administrator is not performed.

7. A non-transitory computer readable storage medium on which is stored a computer program for causing a computer to execute a method for an information processing apparatus managing status information of an image forming apparatus, the method comprising:
    managing job history information recorded by the image forming apparatus;
    managing whether the image forming apparatus is permitted to enter a power saving mode;
    receiving status information from the image forming apparatus;
    if status information has not been received for a certain time period, determining that a status of the image forming apparatus is an unknown status or a status indicative of the power saving mode; and
    if the status of the image forming apparatus is determined to be the unknown status, outputting, to an administrator, information indicating that the status of the image forming apparatus the unknown status,
    wherein if the status of the image forming apparatus is determined to be the status indicative of the power saving mode, an output of information to the administrator is not performed.

* * * * *